United States Patent
Kashihara et al.

(10) Patent No.: US 11,738,719 B2
(45) Date of Patent: Aug. 29, 2023

(54) CONNECTING STRUCTURE OF WIPER ARM

(71) Applicant: MITSUBA Corporation, Gunma (JP)

(72) Inventors: Hiroki Kashihara, Gunma (JP); Tomoya Nishikawa, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/679,041

(22) Filed: Feb. 23, 2022

(65) Prior Publication Data

US 2022/0379849 A1 Dec. 1, 2022

(30) Foreign Application Priority Data

May 26, 2021 (JP) .................................. 2021-088356

(51) Int. Cl.
*B60S 1/40* (2006.01)
*B60S 1/38* (2006.01)
*B60S 1/58* (2006.01)

(52) U.S. Cl.
CPC ............... *B60S 1/3849* (2013.01); *B60S 1/40* (2013.01); *B60S 1/4038* (2013.01); *B60S 1/4041* (2013.01); *B60S 1/4064* (2013.01); *B60S 1/583* (2013.01)

(58) Field of Classification Search
CPC ........ B60S 1/4041; B60S 1/4064; B60S 1/40; B60S 1/4038; B60S 1/3849; B60S 1/3865; B60S 1/3867; B60S 1/3868; B60S 1/583

USPC ....................... 15/250.351, 250.32
See application file for complete search history.

(56) References Cited

U.S. PATENT DOCUMENTS 3,254,358 A * 6/1966 Wise ...................... B60S 1/4041
15/250.32
9,227,599 B2 * 1/2016 Avasiloaie .............. B60S 1/381

FOREIGN PATENT DOCUMENTS

| DE | 102017223142 | * | 6/2019 |
|----|---|---|---|
| EP | 1462327 | * | 9/2004 |
| FR | 3043619 | * | 5/2019 |
| JP | 2015044501 | | 3/2015 |

* cited by examiner

*Primary Examiner* — Gary K. Graham
(74) *Attorney, Agent, or Firm* — JCIPRNET

(57) ABSTRACT

A connecting structure of a wiper arm includes a connecting shaft provided on a wiper arm and a snap-fit provided on a wiper blade. The snap-fit includes a pair of claws defining a groove that can be engaged with the connecting shaft. A slit defined by inner walls facing each other is provided on both sides of the pair of claws in a longitudinal direction of the wiper blade. A first protrusion protruding toward inside of the slit is provided on one of the inner walls, and a second protrusion protruding toward inside of the slit is provided on the other of the inner walls. The first and second protrusions are arranged offset from each other in a direction along an axial direction of the connecting shaft.

4 Claims, 9 Drawing Sheets

CONNECTING STRUCTURE OF WIPER ARM

CROSS-REFERENCE TO RELATED APPLICATIONS

This application claims the priority benefit of Japan Application No. 2021-088356, filed on May 26, 2021. The entirety of the above-mentioned patent application is hereby incorporated by reference herein and made a part of this specification.

BACKGROUND

Technical Field

The disclosure relates to a connecting structure of a wiper arm.

Related Art

A wiper device is mounted on a vehicle such as an automobile. The wiper device includes a wiper motor being a drive source, a wiper arm swung by the drive of the wiper motor, and a wiper blade mounted on a tip side of the wiper arm. The wiper arm and the wiper blade are connected by, for example, a connecting structure described in Patent Document 1. In the connecting structure described in Patent Document 1, the wiper arm and the wiper blade are connected by engaging an attachment groove provided on the wiper arm with a connecting shaft provided on the wiper blade.

Patent Document 1: Japanese Patent Laid-open No. 2015-44501

In the connecting structure of the wiper arm and the wiper blade described in Patent Document 1, by changing a size relationship between widths of the connecting shaft and the attachment groove (groove entrance) between when the wiper blade is in a posture (attachment and detachment posture) of being attached or detached and when the wiper blade is in a posture (rotation posture) of not being attached or detached, the wiper blade can be attached to, detached from or fixed to the wiper arm.

However, in order to prevent the wiper blade from coming off from the wiper arm even if the wiper blade rotates to some extent during a wiping operation of the wiper arm, the position of the wiper blade needs to be set so as to greatly change between the rotation posture and the attachment and detachment posture. That is, it is necessary to set the width of the attachment groove and the diameter of the connecting shaft so that the width of the attachment groove is smaller than the diameter of the connecting shaft when in the rotation posture, and the width of the attachment groove is larger than the diameter of the connecting shaft when in the attachment and detachment posture. At this time, a rotation angle of the wiper blade that enables the width of the attachment groove to be larger than the diameter of the connecting shaft is in a narrow range. That is, the rotation angle of the wiper blade for putting the wiper blade in the attachment and detachment posture is in a narrow range. Accordingly, when the wiper blade is attached or detached, the wiper blade must be greatly rotated, a large space is required, and workability of attachment and detachment of the wiper blade is poor.

SUMMARY

The disclosure provides a connecting structure of a wiper arm, in which workability of attachment and detachment of a wiper blade may be improved.

In one aspect of the disclosure, a connecting structure of a wiper arm is provided, including: a wiper arm; a wiper blade, connected to the wiper arm; a first connecting part, provided on the wiper arm; and a second connecting part, provided on the wiper blade and connected with the first connecting part. Any one of the first connecting part and the second connecting part is a connecting shaft extending along a width direction of the wiper arm. The other of the first connecting part and the second connecting part includes a pair of claws defining a groove able to be engaged with the connecting shaft. The pair of claws have flexibility for bending in a direction of increasing an opening width of the groove. A slit defined by inner walls facing each other is provided on both sides of the pair of claws in a direction along a longitudinal direction of the wiper blade. A first protrusion protruding toward inside of the slit is provided on any one of the inner walls facing each other, and a second protrusion protruding toward inside of the slit is provided on the other of the inner walls facing each other. The first protrusion and the second protrusion are arranged offset from each other in a direction along an axial direction of the connecting shaft.

According to the disclosure, the workability of attachment and detachment of the wiper blade in the connecting structure of a wiper arm can be improved.

DESCRIPTION OF THE EMBODIMENTS

Hereinafter, embodiments of the disclosure are described in detail with reference to the drawings.

Figure 1:
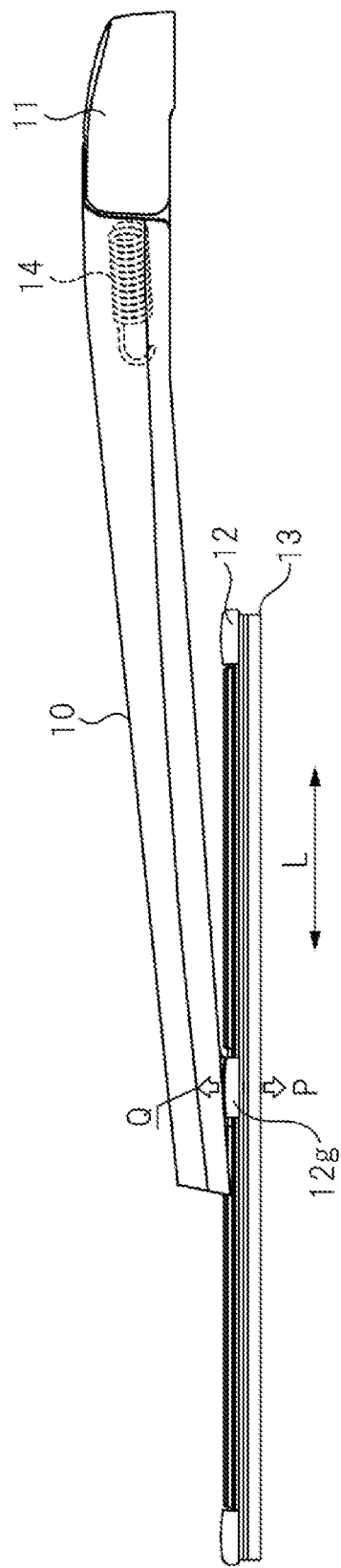
FIG. 1 is a perspective view illustrating a connecting structure of a wiper arm of the disclosure.

A connecting structure of a wiper arm 10 illustrated in FIG. 1 forms, for example, a rear wiper device (not illustrated) that wipes rear glass provided on a vehicle such as an automobile. The connecting structure of the wiper arm 10 includes the wiper arm 10 having an elongated shape, a wiper blade 12 connected to the wiper arm 10, a first connecting part provided on the wiper arm 10, and a second connecting part provided on the wiper blade 12 and connected with the first connecting part. The wiper arm 10 is rotatably supported by an arm head 11.

The wiper blade 12 is rotatably connected to a portion near a tip of the wiper arm 10 in a longitudinal direction L of the wiper blade 12. Meanwhile, an output shaft (not illustrated) of a wiper motor forming the rear wiper device is fixed to a base end side of the wiper arm 10.

By switching on a wiper switch provided in a vehicle compartment or the like, the output shaft of the wiper motor is rotated in forward and reverse directions and the wiper arm 10 swings. Accordingly, blade rubber 13 provided on the wiper blade 12 reciprocates and wipes in a predetermined range on the rear glass. As a result, rainwater or the like adhering to a wiping surface of the rear glass is wiped off.

The wiper arm 10 is formed in a rod shape by injection molding of a resin material such as plastic, and the wiper arm 10 is formed to be thinner on the tip side than on the base end side. More specifically, the wiper arm 10 is formed in a tapered shape that gradually tapers from the base end side toward the tip side. Accordingly, the design of the wiper arm 10 may be improved.

The wiper arm 10 and the wiper blade 12 are connected via a connecting part composed of the first connecting part and the second connecting part. Specifically, an attachment part 12g that supports the second connecting part constituting the connecting part is fixed in a predetermined position on the wiper blade 12 in the longitudinal direction L, and is located between the wiper arm 10 and the wiper blade 12. The attachment part 12g is attached so as to grip the wiper blade 12 provided with the blade rubber 13. The second connecting part is rotatably and detachably engaged with the first connecting part.

A pressing force acts on the wiper arm 10 in a direction of causing the wiper arm 10 to fall toward the rear glass. Accordingly, the wiper blade 12 does not fall off from the wiper arm 10 during the reciprocating wiping operation of the wiper blade 12. The pressing force is generated by a spring force of a tension spring 14 provided on the base end side of the wiper arm 10.

Figure 2:
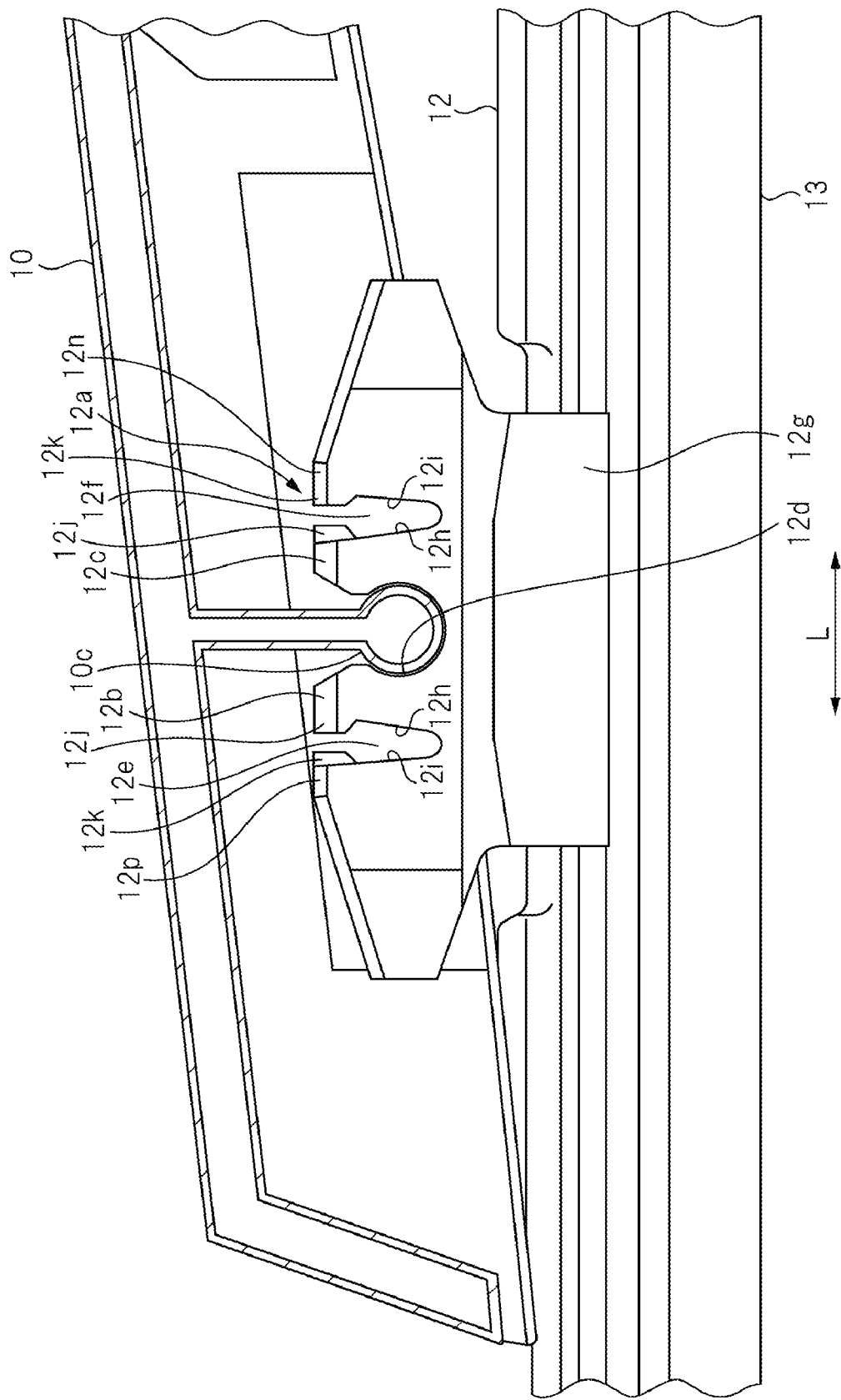
FIG. 2 is a partially enlarged cross-sectional view illustrating a detailed structure of a connecting part in the connecting structure of the wiper arm illustrated in FIG. 1.
Figure 3:
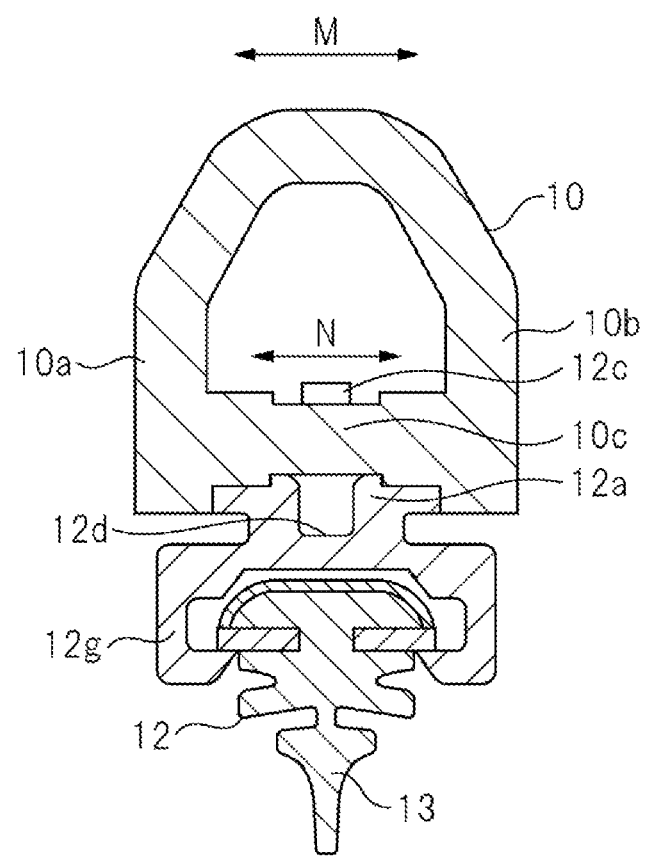
FIG. 3 is a cross-sectional view taken along an axial direction of a connecting shaft illustrated in FIG. 2.
Figure 4:
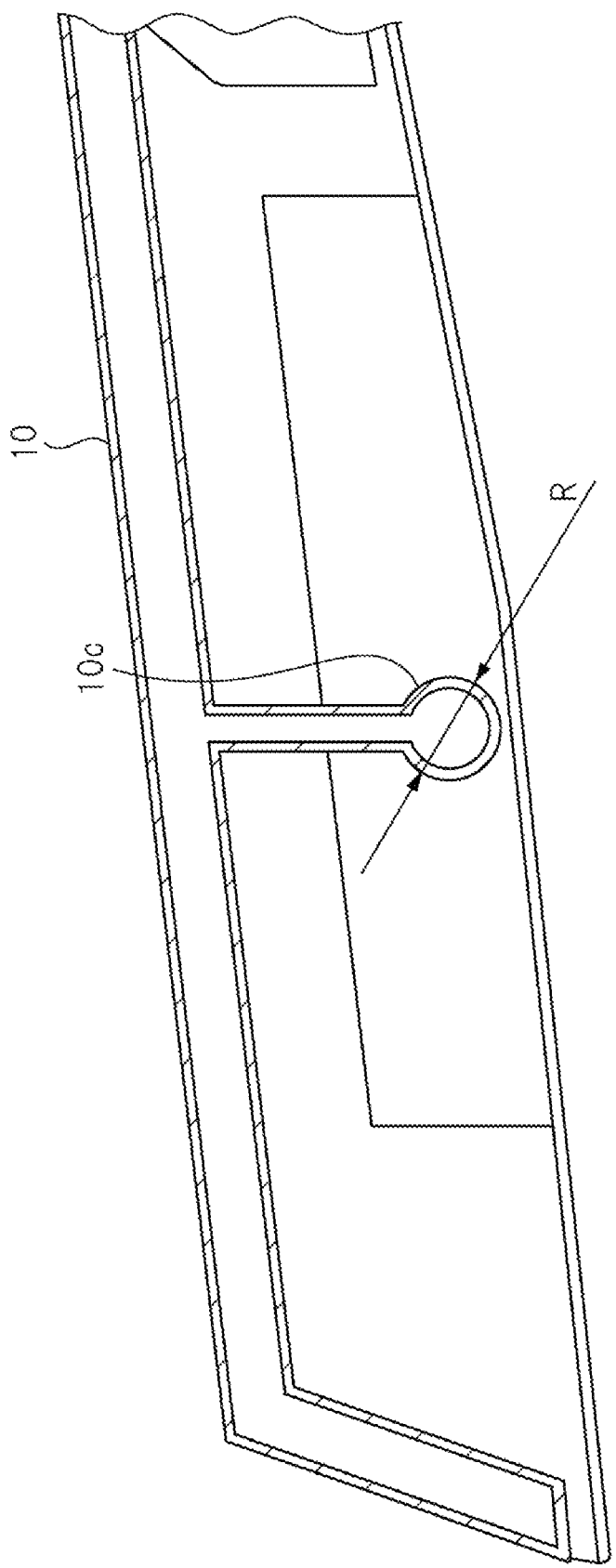
FIG. 4 is a partially enlarged cross-sectional view illustrating a structure of a connecting part on a wiper arm side illustrated in FIG. 2.

Here, the wiper arm 10 includes a pair of sidewalls 10a and 10b facing each other, as illustrated in FIG. 3. Any one of the first connecting part and the second connecting part is a connecting shaft 10c that extends along a width direction M of the wiper arm 10 illustrated in FIG. 3 intersecting the longitudinal direction L of the wiper blade 12 illustrated in FIG. 1, in which the pair of sidewalls 10a and 10b of the wiper arm 10 are joined together. The other of the first connecting part and the second connecting part is a snap-fit 12a that includes a pair of claws 12b and 12c defining a groove 12d illustrated in FIG. 2 that can be engaged with the connecting shaft 10c. In the present embodiment, a case is described where the first connecting part provided on the wiper arm 10 is the connecting shaft 10c, as illustrated in FIG. 4, and the second connecting part provided on the wiper blade 12 is the snap-fit 12a, as illustrated in FIG. 2.

The pair of claws 12b and 12c included in the snap-fit 12a are provided side by side along the longitudinal direction L of the wiper blade 12 and are flexible with respect to each other.

As illustrated in FIG. 2, the connecting shaft 10c on the wiper arm 10 side and the groove 12d on the wiper blade 12 side are engaged with each other. Specifically, the groove 12d is formed on the snap-fit 12a, and the connecting shaft 10c provided on the wiper arm 10 and the groove 12d of the snap-fit 12a attached to the wiper blade 12 are engaged with each other. That is, the connecting shaft 10c provided on the wiper arm 10 and the snap-fit 12a attached to the wiper blade 12 are snap-fitted together. At this time, the connecting shaft 10c and the groove 12d are engaged so that the snap-fit 12a can be rotated a desired angle with respect to the connecting shaft 10c.

The connecting shaft 10c illustrated in FIG. 3 has a cylindrical shape. An outer peripheral shape of a section (illustrated in FIG. 4) of the connecting shaft 10c in a direction orthogonal to an axial direction N (extension direction of the shaft) of the connecting shaft 10c is circular. Meanwhile, the groove 12d having a substantially cylindrical shape is formed on the snap-fit 12a. The connecting shaft 10c having a cylindrical shape is rotatably fitted into the groove 12d having a substantially cylindrical shape.

Specifically, as illustrated in FIG. 2, on the snap-fit 12a attached to the wiper blade 12, the groove 12d defined by the pair of claws 12b and 12c is formed to have a circular cross-sectional shape on an inner peripheral surface of the groove 12d. A diameter of the circle on the inner peripheral surface of the groove 12d is slightly larger than a diameter of the circle of the connecting shaft 10c. Accordingly, the snap-fit 12a is engaged with the connecting shaft 10c so that it can be rotated a desired angle with respect to the connecting shaft 10c.

Figure 6:
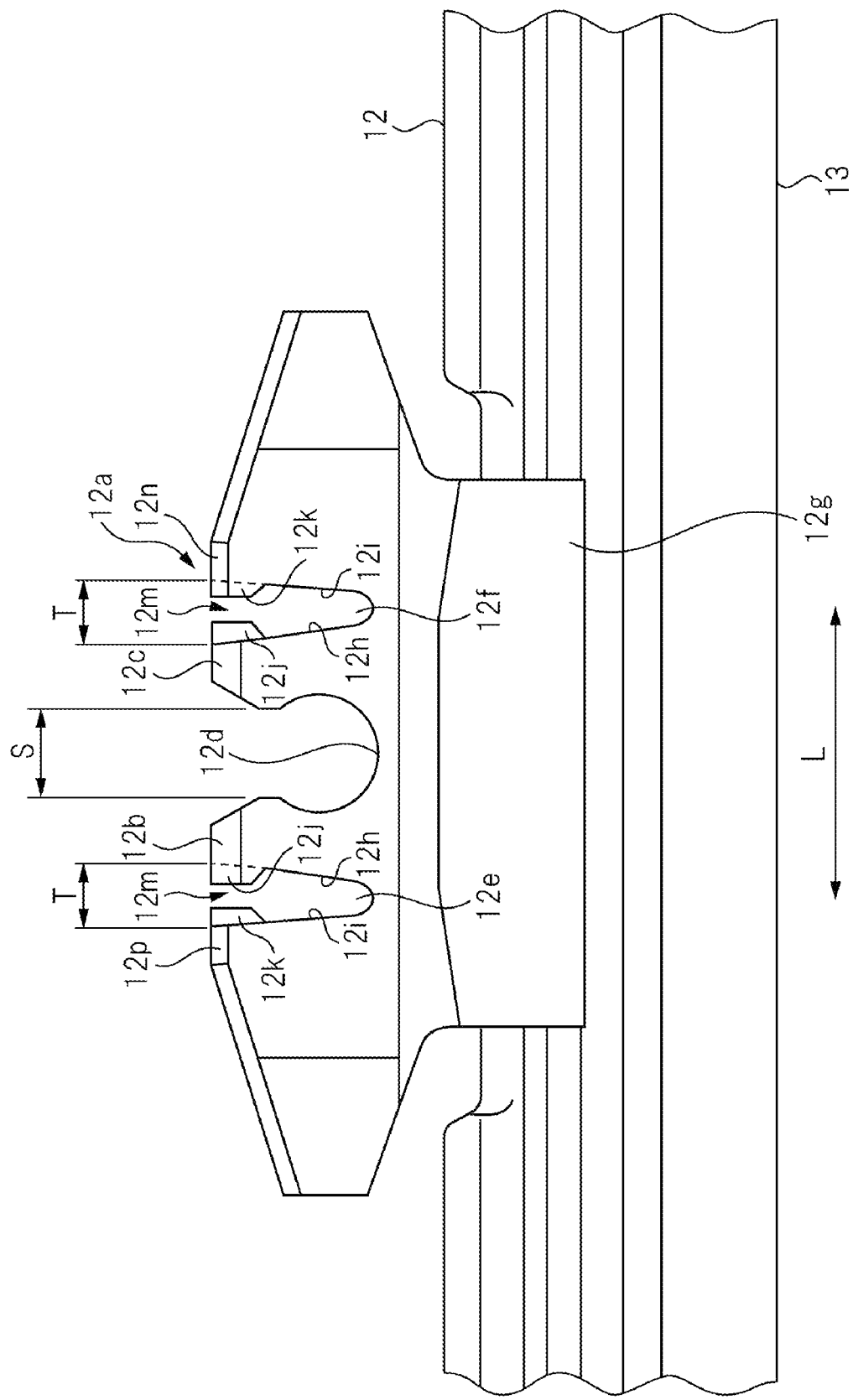
FIG. 6 is a partially enlarged view illustrating a structure in which the connecting part illustrated in FIG. 5 is assembled to a wiper blade.

As illustrated in FIG. 6, a distance S between portions of the pair of claws 12b and 12c of the snap-fit 12a facing each other is smaller than a diameter R (illustrated in FIG. 4) of the connecting shaft 10c having a circular shape. That is, since the distance S between the portions of the pair of claws 12b and 12c facing each other is also an opening width of the groove 12d, it is preferable that R>S. Accordingly, it can be prevented that the snap-fit 12a comes off from the connecting shaft 10c when the wiping surface of the rear glass or the like of the vehicle is being wiped by an operation of the wiper arm 10.

In the connecting structure of the wiper arm 10 of the present embodiment, by adopting the connection by the snap-fit 12a for the connection between the wiper arm 10 and the wiper blade 12, the claws 12b and 12c are bent when the connecting shaft 10c is inserted into the groove 12d, and S temporarily becomes larger than R. Hence, the connecting shaft 10c can be inserted into the groove 12d.

As illustrated in FIG. 2, in a direction along the longitudinal direction L of the wiper blade 12, slits 12e and 12f being notches are provided on both sides of the pair of claws 12b and 12c. Specifically, the slit 12e is provided on an outer side (side of the claw 12b opposite the groove 12d) of the claw 12b, and the slit 12f is provided on an outer side (side of the claw 12c opposite the groove 12d) of the claw 12c. In other words, space is provided on both sides of the claw 12b and on both sides of the claw 12c.

Accordingly, each of the pair of claws 12b and 12c is able to bend in a direction away from the groove 12d in the direction along the longitudinal direction L of the wiper blade 12. That is, each of the pair of claws 12b and 12c has flexibility for bending in the direction away from the groove 12d in the longitudinal direction L of the wiper blade 12. In other words, the pair of claws 12b and 12c have flexibility for bending in a direction of increasing the opening width S of the groove 12d illustrated in FIG. 6.

According to the above, in the connecting structure of the wiper arm 10 of the present embodiment, by adopting the connection by the snap-fit 12a, in assembly of the wiper arm 10 and the wiper blade 12, it is possible to realize an insertion force Q for facilitating assembly and a removal force P for impeding removal as illustrated in FIG. 1.

Here, an effect obtained by bending each of the pair of claws 12b and 12c in the direction away from the groove 12d is described. For example, in the case where each of the claws 12b and 12c is to be bent along the width direction M (see FIG. 3) of the wiper blade 12, the wiper blade 12 is increased in size in the width direction M. Since the field of view of the driver of the vehicle must not be obstructed during the wiping operation by the wiper blade 12, an increase in size of the wiper blade 12 in the width direction M must be avoided.

On the other hand, in the case where each of the claws 12b and 12c is to be bent in the longitudinal direction L (see FIG. 2) of the wiper blade 12, since it is easy to secure space for the longitudinal direction L, it is possible to easily bend in the longitudinal direction L, and it is also easy to increase the amount of bending of the claws 12b and 12c or the like.

In order to rotatably connect the wiper blade 12 to the wiper arm 10 so that the wiper blade 12 follows a curved surface of the rear glass, the axial direction N of the connecting shaft 10c illustrated in FIG. 3 is preferably arranged so as to be parallel to the width direction M of the wiper blade 12. Accordingly, in the case of bending the claws 12b and 12c in the longitudinal direction L, the space required for the snap-fit 12a is equal to a sum of the width of each of the claws 12b and 12c plus the amount of bending plus the diameter of the connecting shaft 10c.

In contrast, in the case of bending the claws 12b and 12c in the width direction M, the space required for the snap-fit 12a is equal to a sum of the width of each of the claws 12b and 12c plus the amount of bending plus the shaft length of the connecting shaft 10c. Accordingly, in the snap-fit 12a, by bending each of the claws 12b and 12c in the direction away from the groove 12d in the longitudinal direction L of the wiper blade 12, it is relatively possible to reduce the size of the wiper blade 12.

If the connection by the snap-fit 12a is not adopted for the connection between the wiper arm 10 and the wiper blade 12, in order to prevent the wiper blade 12 from coming off during the rotation posture in which the wiper blade 12 is not being attached or detached, it is necessary to greatly change a positional relationship between the wiper blade 12 and the wiper arm 10 between the attachment and detachment posture in which the wiper blade 12 is being attached or detached and the above-mentioned rotation posture. That is, when the wiper arm 10 and the wiper blade 12 are assembled, it is necessary to greatly rotate the wiper blade 12 for assembly, and a wide work space is required. Further, a rotation direction of the wiper blade 12 is limited so that the portions of the wiper arm 10 and the wiper blade 12 other than the connecting part do not contact each other. It is necessary to provide an escape part such as a recess in the wiper blade 12 so that the tip of the wiper arm 10 does not interfere with the wiper blade 12. Further, in order to evenly transmit the pressing force of the wiper arm 10 to the wiper blade 12, the connecting part of the wiper arm 10 and the wiper blade 12 is preferably provided at a central part of the wiper blade 12. However, in the case where the connection by the snap-fit 12a is not adopted, since the wiper blade 12 and the tip of the wiper arm 10 may interfere with each other, it is necessary to arrange the connecting part at the tip of the wiper arm 10. Hence, there is a design limitation that about half of the wiper blade 12 in the longitudinal direction cannot be covered by the wiper arm 10.

In contrast, in the connecting structure of the wiper arm 10 of the present embodiment, by adopting the connection by the snap-fit 12a for the connection between the wiper arm 10 and the wiper blade 12, it is possible to set the opening width S of the groove 12d of the snap-fit 12a to be smaller than the diameter R of the connecting shaft 10c having a cylindrical shape, and to make it difficult for the wiper blade 12 to come off. Accordingly, since there is no need to greatly change the positional relationship between the wiper blade 12 and the wiper arm 10 between the attachment and detachment posture and the rotation posture of the wiper blade 12, it is possible to reduce limitations on the work space or the assembly direction of the wiper blade 12. That is, the workability of attachment and detachment of the wiper blade 12 can be improved in the connecting structure of the wiper arm 10.

In the attachment and detachment of the wiper blade 12, since there is no need to rotate the wiper blade 12 to an angle at which the tip of the wiper arm 10 and the wiper blade 12 interfere with each other, there is no longer need to provide an escape part for the wiper arm 10 in the wiper blade 12, and the height of the wiper blade 12 can be reduced. Further, since limitations on an installation position of the connecting shaft 10c in the longitudinal direction L of the wiper blade 12 are also reduced, for example, the tip of the wiper arm 10 can be extended to a tip of the wiper blade 12, the degree of freedom in the design of the wiper arm 10 can be increased.

In the wiper arm 10 and the wiper blade 12, since consumable blade rubber is mounted on the wiper blade 12, the wiper blade 12 may be replaced much more frequently than the wiper arm 10. Accordingly, by attaching the snap-fit 12a including the claws 12b and 12c to the wiper blade 12 as in the present embodiment, in case the claws 12b and 12c are damaged or deteriorate, it is possible to easily to replace the wiper blade 12 and all.

Next, protrusions 12j and 12k arranged in the slits 12e and 12f are described with reference to FIG. 5 and FIG. 6. Here, the slits 12e and 12f are each defined by inner walls 12h and 12i facing each other. That is, the slit 12e is defined by the inner walls 12h and 12i facing each other; meanwhile, the slit 12f is also defined by the inner walls 12h and 12i facing each other.

On any one of the inner walls 12h and 12i facing each other that define each of the slits 12e and 12f, a first protrusion protruding toward inside of the slit is provided. Moreover, on the other of the inner walls facing each other, a second protrusion protruding toward inside of the slit is provided. In the present embodiment, the protrusion (first protrusion) 12j protruding toward inside of the slit is provided on the inner wall 12h, and the protrusion (second protrusion) 12k protruding toward inside of the slit is provided on the inner wall 12i. Specifically, in the slit 12e, the protrusion 12j protruding toward inside of the slit 12e is provided on the inner wall 12h, and the protrusion 12k protruding toward inside of the slit 12e is provided on the inner wall 12i of a wall part 12p facing the claw 12b. Meanwhile, in the slit 12f, the protrusion 12j protruding toward inside of the slit 12f is provided on the inner wall 12h, and the protrusion 12k protruding toward inside of the slit 12f is provided on the inner wall 12i of a wall part 12n facing the claw 12c.

Figure 5:
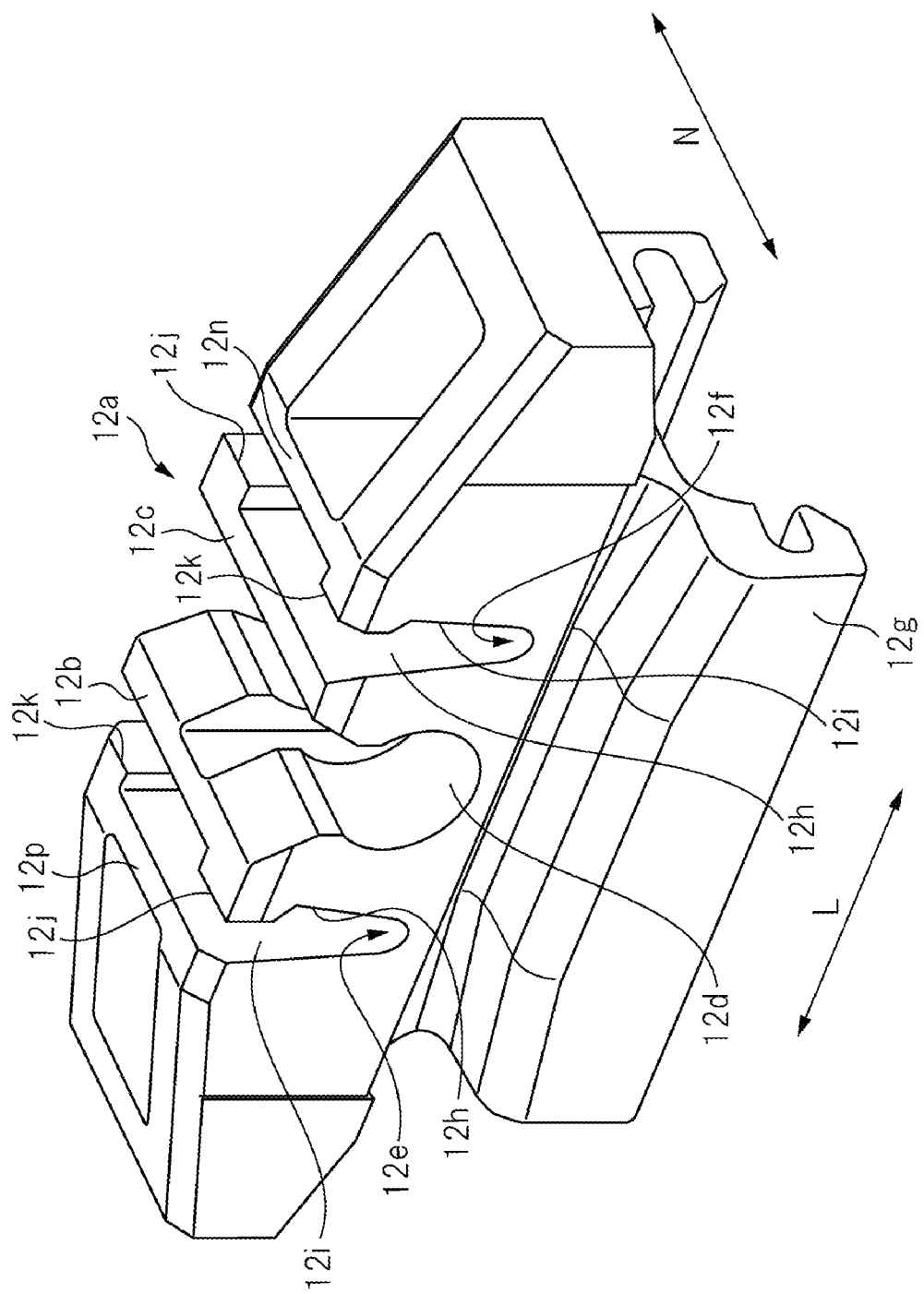
FIG. 5 is an enlarged perspective view illustrating a structure of a connecting part on a wiper blade side illustrated in FIG. 2.

As illustrated in FIG. 5, the protrusions 12*j* and 12*k* are arranged offset from each other in a direction along the axial direction N of the connecting shaft 10*c* illustrated in FIG. 3. That is, the protrusion 12*j* provided on the inner wall 12*h* and the protrusion 12*k* provided on the inner wall 12*i* are arranged offset without overlapping each other in the direction along the axial direction N. In other words, the protrusion 12*j* and the protrusion 12*k* protrude from the inner walls 12*h* and 12*i* facing each other so as to be alternate with each other in the direction along the axial direction N.

As illustrated in FIG. 6, the protrusions 12*j* and 12*k* are provided on the inner walls 12*h* and 12*i* facing each other so as to be located near an opening end 12*m* of each of the slits 12*e* and 12*f*. Specifically, the protrusions 12*j* and 12*k* are provided on the inner walls 12*h* and 12*i* so as to be located on the opening end 12*m* side opposite a bottom side of the slits 12*e* and 12*f*.

The inner walls 12*h* and 12*i* arranged to face each other in order to define the slits 12*e* and 12*f* are formed so that an opening width T of the slits 12*e* and 12*f* gradually increases from the bottom toward the opening end 12*m* of the slits 12*e* and 12*f*. That is, the inner walls 12*h* and 12*i* facing each other are provided obliquely to each other so that the opening width T of the slits 12*e* and 12*f* gradually increases from the bottom toward the opening end 12*m* of the slits 12*e* and 12*f*. In other words, in each of the slits 12*e* and 12*f*, the inner wall 12*h* facing the protrusion 12*k* is obliquely provided so that the opening width T of the slits 12*e* and 12*f* gradually decreases toward the bottom; meanwhile, the inner wall 12*i* facing the protrusion 12*j* is also obliquely provided so that the opening width T of the slits 12*e* and 12*f* gradually decreases toward the bottom. That is, both the inner wall 12*h* facing the protrusion 12*k* and the inner wall 12*i* facing the protrusion 12*j* are obliquely provided so that the opening width T of the slits 12*e* and 12*f* gradually decreases toward the bottom.

Figure 9:
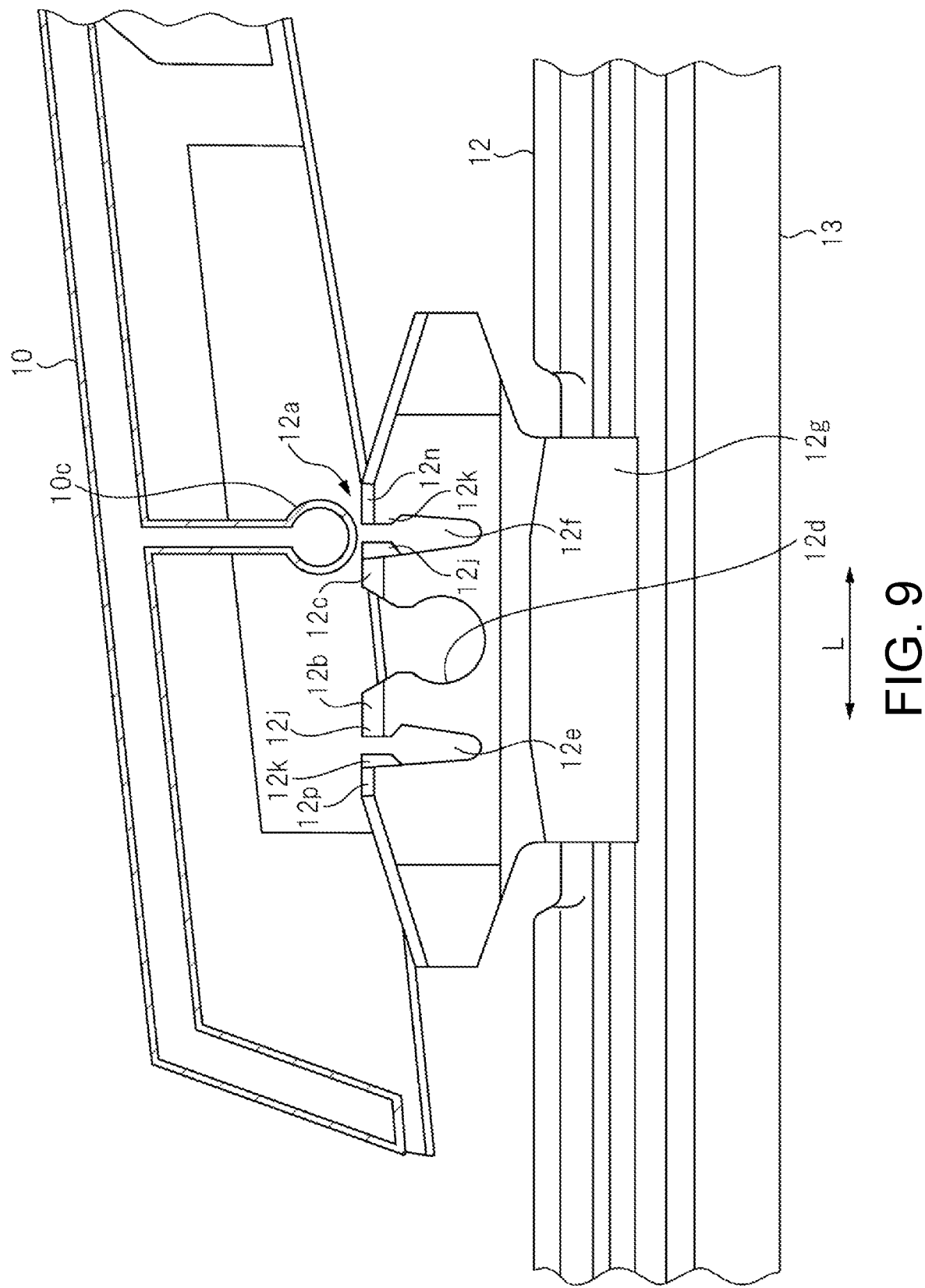
FIG. 9 is a partial cross-sectional view illustrating a state in which misassembly of a wiper blade is prevented in the connecting structure of the wiper arm of the disclosure.

In the snap-fit 12*a* of the present embodiment, since the protrusion 12*j* and the protrusion 12*k* are alternately arranged in each of the slits 12*e* and 12*f*, as illustrated in FIG. 9, when the wiper arm 10 and the wiper blade 12 are assembled, the connecting shaft 10*c* of the wiper arm 10 can be prevented from being inserted into the slits 12*e* and 12*f* of the wiper blade 12. That is, by alternately arranging the protrusions 12*j* and 12*k* and narrowing the opening end 12*m* of the slits 12*e* and 12*f*, the connecting shaft 10*c* of the wiper arm 10 will not be inserted into the slits 12*e* and 12*f*. That is, it is possible to prevent misassembly of the wiper arm 10 and the wiper blade 12. As a result, in the connecting structure of the wiper arm 10, misassembly of the wiper blade 12 can be prevented and workability during assembly of the wiper blade 12 can be improved.

In each of the slits 12*e* and 12*f*, the protrusions 12*j* and 12*k* are provided so as to be located near the opening end 12*m*, and the thickness of the roots of the claws 12*b* and 12*c* in the snap-fit 12*a* is not increased. Accordingly, in the pair of claws 12*b* and 12*c*, the flexibility for bending in the direction of increasing the opening width S of the groove 12*d* is maintained unchanged. Accordingly, in the snap-fit 12*a* having a structure in which the protrusions 12*j* and 12*k* are provided in each of the slits 12*e* and 12*f*, in the assembly of the wiper arm 10 and the wiper blade 12, the insertion force Q for facilitating assembly and the removal force P for impeding removal as illustrated in FIG. 1 are still realized.

Figure 7:
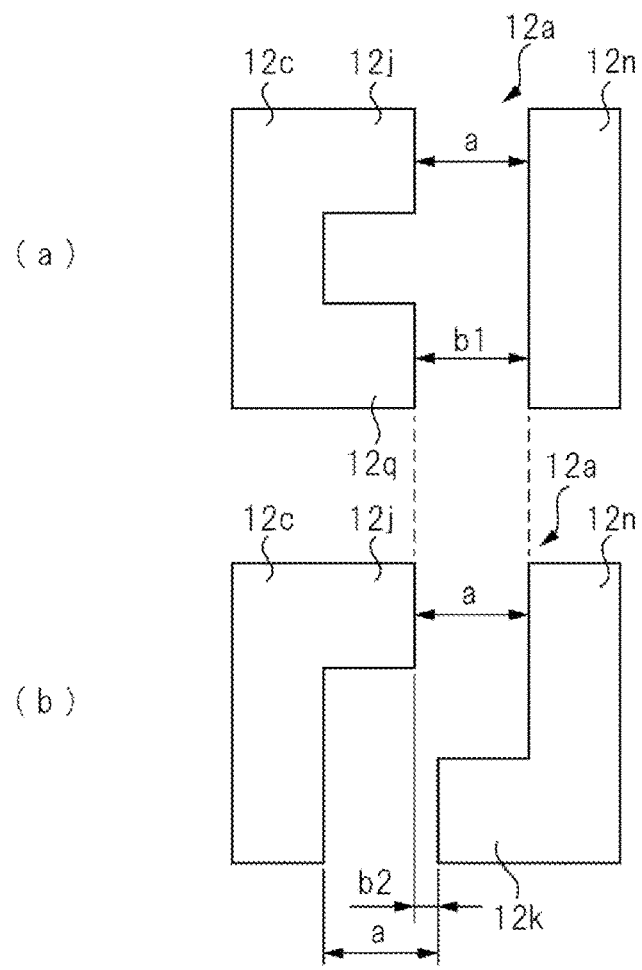
FIG. 7 illustrates a protrusion direction of a protrusion in the connecting part illustrated in FIG. 5, in which (a) of FIG. 7 is a schematic view of a protrusion of a comparative example, and (b) of FIG. 7 is a schematic view of a protrusion of the present embodiment.

Here, a difference in effects obtained between a structure ((a) of FIG. 7) in which protrusions 12*j* and 12*q* protrude in the same direction and a structure ((b) of FIG. 7) in which the protrusions 12*j* and 12*k* protrude in an alternate manner is described.

Firstly, in the structure illustrated in (a) of FIG. 7 in which the protrusions 12*j* and 12*q* protrude in the same direction, when a represents a width (fixed value) required for bending of the claw 12*c*, and b1 represents a width of a gap into which the connecting shaft 10*c* is likely to fall, then b1=a. The numerical value a can be set to a predetermined magnitude from the ease of assembly of the snap-fit 12*a* and the connecting shaft 10*c* or the difficulty of disengagement.

On the other hand, in the structure illustrated in (b) of FIG. 7 in which the protrusions 12*j* and 12*k* protrude in an alternate manner, when a represents the width (fixed value) required for bending of the claw 12*c*, and b2 represents the width of the gap into which the connecting shaft 10*c* is likely to fall, then it is possible to set that b2=a−(amount of protrusion of the protrusion 12*j*), and b2<b1. That is, in the structure illustrated in (b) of FIG. 7 in which the protrusions 12*j* and 12*k* protrude in an alternate manner, it is relatively possible to reduce the gap into which the connecting shaft 10*c* is likely to fall. That is, by alternately arranging the protrusions 12*j* and 12*k* in the slits 12*e* and 12*f*, the gap into which the connecting shaft 10*c* is likely to fall can be reduced, and misassembly of the wiper arm 10 and the wiper blade 12 can be prevented.

Figure 8:
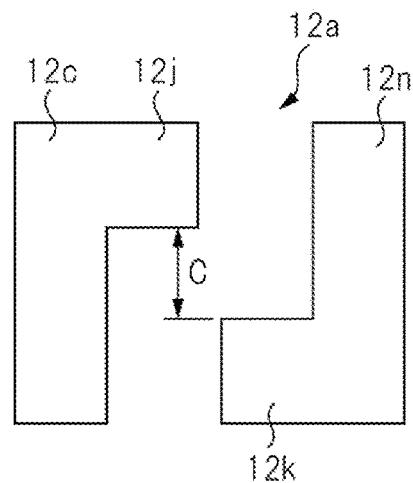
FIG. 8 is a schematic view illustrating a relationship of a gap between protrusions in the connecting part illustrated in FIG. 5.

A distance C between the protrusion 12*j* and the protrusion 12*k* illustrated in FIG. 8 may be small to the extent that the protrusion 12*j* and the protrusion 12*k* do not interfere with each other. In other words, the width of the protrusion 12*j* and the protrusion 12*k* may be set large to the extent that the protrusion 12*j* and the protrusion 12*k* do not interfere with each other.

Next, modifications of the present embodiment are described.

Figure 10:
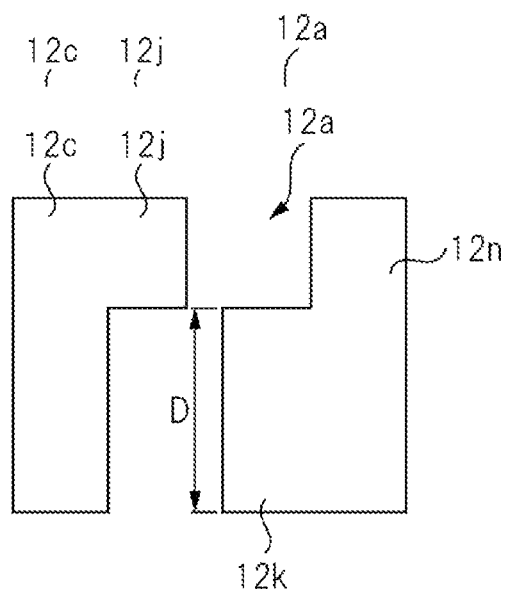
FIG. 10 is a schematic view illustrating a structure of a protrusion of a first modification in a connecting part of the disclosure.

In a first modification illustrated in FIG. 10, the width of the protrusion 12*j* and the protrusion 12*k* is set large. In the structure illustrated in FIG. 10, a width D of the protrusion 12*k* is set larger than that of the protrusion 12*j*. As described above, the width of the protrusion 12*j* and the protrusion 12*k* may be set large to the extent that the protrusion 12*j* and the protrusion 12*k* do not interfere with each other. In that case, between the protrusion 12*j* provided on the claw 12*c* side and the protrusion 12*k* provided on the wall part 12*n* side, it is preferable to increase the width of the protrusion 12*k* provided on the wall part 12*n* side. That is, if the width of the protrusion 12*j* provided on the claw 12*c* side is increased, a relatively great influence may be exerted on bending or strength of the claw 12*c*, which is therefore unfavorable. Accordingly, by increasing the width of the protrusion 12*k* provided on the wall part 12*n* side, the influence on bending or strength of the claw 12*c* can be minimized. This also applies to the claw 12*b* and the wall part 12*p* illustrated in FIG. 6.

Figure 11:
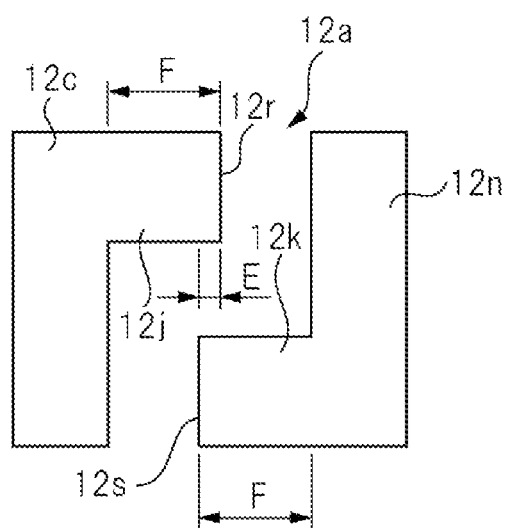
FIG. 11 is a schematic view illustrating a structure of a protrusion of a second modification in a connecting part of the disclosure.

In a second modification illustrated in FIG. 11, the productions 12*j* and 12*k* are arranged to partially overlap each other in the direction L (see FIG. 6) orthogonal to the axial direction N of the connecting shaft 10*c* illustrated in FIG. 3. In the structure of the snap-fit 12*a* illustrated in FIG. 11, the protrusions 12*j* and 12*k* are arranged so that their respective tips 12*r* and 12*s* overlap in the direction L orthogonal to the axial direction N of the connecting shaft 10*c*.

Specifically, the tip 12*r* of the protrusion 12*j* and the tip 12*s* of the protrusion 12*k* overlap as an overlap part E in the direction L orthogonal to the axial direction N of the connecting shaft 10*c*. That is, the protrusions 12*j* and 12*k* are provided so that the portions of the overlap part E within a protrusion length F of each of the protrusions 12*j* and 12*k* overlap.

In this way, by arranging the protrusions 12*j* and 12*k* so that their respective tips 12*r* and 12*s* overlap in the direction L orthogonal to the axial direction N of the connecting shaft 10*c*, there is no gap between the protrusion 12*j* and the protrusion 12*k* in the direction L. As a result, insertion of the connecting shaft 10*c* of the wiper arm 10 into the slits 12*e* and 12*f* of the wiper blade 12 can further be suppressed, and the effect of preventing misassembly of the wiper arm 10 and the wiper blade 12 can be further enhanced.

It goes without saying that the disclosure is not limited to the above embodiments but can be modified in various ways without departing from the gist thereof. For example, the above embodiments illustrate the case of applying the connecting structure of the wiper arm 10 to a rear wiper device that wipes the rear glass of a vehicle such as an automobile. However, the disclosure is not limited thereto and may be applied to a wiper device mounted on a front side of a vehicle such as an automobile, or a wiper device mounted on a ship, an aircraft, a railroad vehicle or the like. In the above embodiments, the wiper arm 10 is molded from a resin material. However, the disclosure is not limited thereto, and the wiper arm 10 may be molded from a metal material.

What is claimed is:

1. A connecting structure of a wiper arm, comprising:
   a wiper blade, connected to the wiper arm;
   a first connecting part, provided on the wiper arm; and
   a second connecting part, provided on the wiper blade and connected with the first connecting part, wherein
   any one of the first connecting part and the second connecting part is a connecting shaft extending along a width direction of the wiper arm;
   the other of the first connecting part and the second connecting part comprises a pair of claws defining a groove able to be engaged with the connecting shaft;
   the pair of claws have flexibility for bending in a direction of increasing an opening width of the groove;
   a slit defined by inner walls facing each other is provided on each side of the pair of claws in a direction along a longitudinal direction of the wiper blade;
   a first protrusion protruding toward inside each of the slits is provided on any one of the inner walls facing each other, and a second protrusion protruding toward inside each of the slits is provided on the other of the inner walls facing each other;
   the first protrusions and the second protrusions are respectively arranged offset from each other in a direction along an axial direction of the connecting shaft, and the first protrusions face a flat surface of a respective one of the inner walls, and the second protrusions face a flat surface of another respective one of the inner walls, wherein the first protrusions and the second protrusions respectively partially overlap each other in a direction orthogonal to the axial direction of the connecting shaft.

2. The connecting structure of a wiper arm according to claim 1, wherein
   the first protrusions and the second protrusions are provided on the inner walls facing each other so as to be located at an opening end of each of the slits.

3. The connecting structure of a wiper arm according to claim 1, wherein
   the inner walls facing each other are formed so that an opening width of each of the slits gradually increases toward an opening end of each of the slits.

4. The connecting structure of a wiper arm according to claim 1, wherein
   the first connecting part is the connecting shaft, and the second connecting part is the pair of claws.

* * * * *